US011938698B2

(12) United States Patent
Aganovic et al.

(10) Patent No.: US 11,938,698 B2
(45) Date of Patent: Mar. 26, 2024

(54) CONTAINER FORMING APPARATUS AND METHOD

(71) Applicant: Westrock Shared Services, LLC, Atlanta, GA (US)

(72) Inventors: Amer Aganovic, Orlando, FL (US); Thomas Dean Graham, Winter Garden, FL (US)

(73) Assignee: WestRock Shared Services, LLC, Atlanta, GA (US)

( * ) Notice: Subject to any disclaimer, the term of this patent is extended or adjusted under 35 U.S.C. 154(b) by 0 days.

(21) Appl. No.: 17/903,643

(22) Filed: Sep. 6, 2022

(65) Prior Publication Data

US 2023/0075478 A1 Mar. 9, 2023

Related U.S. Application Data

(62) Division of application No. 13/827,263, filed on Mar. 14, 2013, now Pat. No. 11,433,634.

(60) Provisional application No. 61/716,272, filed on Oct. 19, 2012.

(51) Int. Cl.

| | |
|---|---|
| ***B31B 50/00*** | (2017.01) |
| *B31B 50/28* | (2017.01) |
| *B31B 50/44* | (2017.01) |
| *B31B 50/62* | (2017.01) |
| *B31B 50/81* | (2017.01) |
| *B31B 100/00* | (2017.01) |
| *B31B 110/30* | (2017.01) |
| *B31B 120/00* | (2017.01) |

(52) U.S. Cl.

CPC .............. *B31B 50/00* (2017.08); *B31B 50/28* (2017.08); *B31B 50/44* (2017.08); *B31B 50/624* (2017.08); *B31B 50/81* (2017.08); *B31B 2100/00* (2017.08); *B31B 2100/0024* (2017.08); *B31B 2110/30* (2017.08); *B31B 2120/002* (2017.08); *B31B 2120/502* (2017.08)

(58) Field of Classification Search

CPC ... B31B 50/00; B31B 50/624; B31B 2100/00; B31B 2100/0024; B31B 50/44; B31B 2120/002; B31B 50/81; B31B 2110/30; B31B 2120/502; B31B 50/28

USPC .......................................................... 493/122

See application file for complete search history.

(56) References Cited

U.S. PATENT DOCUMENTS

| | | | | |
|---|---|---|---|---|
| 3,511,139 A | | 5/1970 | Edkvist | |
| 3,513,757 A | * | 5/1970 | Di Frank ................. | B65H 1/06 493/131 |
| 3,593,623 A | | 7/1971 | Oakley | |
| 3,648,573 A | | 3/1972 | Le Febvre et al. | |
| 4,052,933 A | | 10/1977 | Royal | |
| 4,596,542 A | | 6/1986 | Moen | |
| 4,617,081 A | | 10/1986 | Bleau et al. | |
| 5,147,271 A | * | 9/1992 | Bacques ................ | B65D 5/001 493/143 |

(Continued)

*Primary Examiner* — Sameh Tawfik

(74) *Attorney, Agent, or Firm* — Neil G. Cohen; Rohini K. Garg

(57) ABSTRACT

An apparatus for forming a container from a blank is provided. The apparatus includes a blank feeder assembly, and a compression assembly including a mandrel assembly, an upper folding arm assembly including a plurality of folding arms moveable between a first position and a second position, a compression plate, and a rollover arm assembly.

9 Claims, 11 Drawing Sheets

(56) References Cited

U.S. PATENT DOCUMENTS

| | | | | | |
|---|---|---|---|---|---|
| 5,160,307 | A * | 11/1992 | Bacques | B65D 5/029 493/295 |
| 5,537,806 | A | 7/1996 | Grierson et al. | |
| 5,624,368 | A | 4/1997 | Cromwell | |
| 5,772,108 | A | 6/1998 | Ruggiere, Sr. et al. | |
| 6,106,450 | A | 8/2000 | Brittain | |
| 6,571,539 | B2 | 6/2003 | Gendre et al. | |
| 7,559,884 | B2 | 7/2009 | Kisch | |
| 7,857,743 | B2 | 12/2010 | Barner | |
| 8,105,223 | B2 * | 1/2012 | Graham | B65D 5/6629 493/143 |
| 8,128,547 | B2 | 3/2012 | Graham et al. | |
| 8,323,165 | B2 * | 12/2012 | Atoui | B31B 50/00 493/391 |
| 9,022,913 | B2 * | 5/2015 | Graham | B65D 5/0227 493/51 |
| 10,987,889 | B2 * | 4/2021 | Graham | B31B 50/10 |
| 2003/0119640 | A1 * | 6/2003 | Jaen | B31B 50/46 493/162 |
| 2007/0037682 | A1 | 2/2007 | Scholtes et al. | |
| 2010/0219232 | A1 * | 9/2010 | Smith | B65D 5/029 229/199 |
| 2011/0065559 | A1 * | 3/2011 | Atoui | B31B 50/30 493/162 |
| 2011/0281705 | A1 * | 11/2011 | Aganovic | B31B 50/26 493/162 |
| 2012/0100976 | A1 * | 4/2012 | Graham | B31B 50/00 414/795.4 |
| 2017/0080666 | A1 * | 3/2017 | Graham | B31B 50/72 |
| 2017/0080667 | A1 * | 3/2017 | Graham | B31B 50/10 |

* cited by examiner

CONTAINER FORMING APPARATUS AND METHOD

CROSS REFERENCE TO RELATED APPLICATIONS

This application is a divisional of and claims priority to U.S. patent application Ser. No. 13/827,263 filed on Mar. 14, 2013, entitled "CONTAINER FORMING APPARATUS AND METHOD", which claims priority to U.S. Provisional Application No. 61/716,272 filed Oct. 19, 2012, all of which are hereby incorporated herein by reference in their entireties.

BACKGROUND OF THE INVENTION

The field of the invention relates generally to a machine for forming a polygonal container from a blank, and more particularly to a machine for automatically forming a polygonal container having reinforced corner structures.

Containers are frequently utilized to store and aid in transporting products. The shape of the container can provide additional strength to the container. For example, octagonal-shaped containers provide greater resistance to bulge over conventional rectangular, square or even hexagonal-shaped containers.

In at least some known cases, a blank of sheet material is used to form a container for transporting a product. More specifically, these known containers are formed by a machine that folds a plurality of panels along fold lines and secures these panels with an adhesive. Such containers may have certain strength requirements for transporting products. These strength requirements may include a stacking strength requirement such that the containers can be stacked on one another during transport, and/or storage and/or display without collapsing. Further, these strength requirements may include a strength requirement such that the containers do not collapse when the containers are placed in harsh environments such as high heat, humidity, ice, water, etc. It is desirable to provide a machine to automatically form a container that meets these strength requirements.

BRIEF DESCRIPTION OF THE INVENTION

In one aspect, an apparatus for forming a container from a blank is provided. The apparatus includes a blank feeder assembly, and a compression assembly including a mandrel assembly, an upper folding arm assembly including a plurality of folding arms moveable between a first position and a second position, a compression plate, and a rollover arm assembly.

In another aspect, a method of forming a container is provided. The method includes positioning a blank in a blank feeder assembly, feeding the blank to a compression assembly, and forming the container from the blank within the compression assembly, wherein the compression assembly includes a mandrel assembly, an upper folding arm assembly including a plurality of folding arms moveable between a first position and a second position, a compression plate, and a rollover arm assembly.

DETAILED DESCRIPTION OF THE INVENTION

Figure 1:
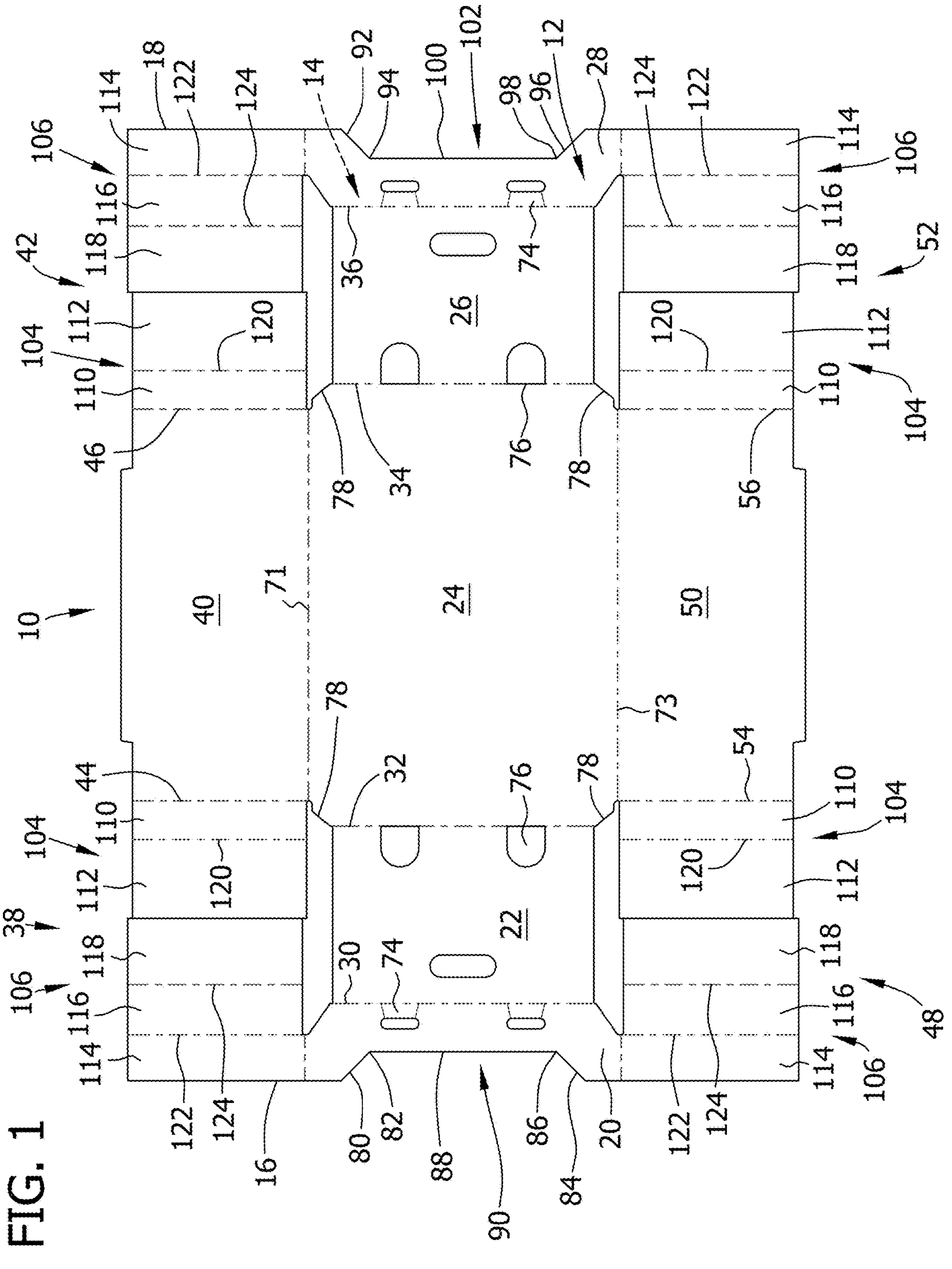
FIG. 1 is a top plan schematic view of a blank of sheet material of an exemplary embodiment.

The following detailed description illustrates the disclosure by way of example and not by way of limitation. The description clearly enables one skilled in the art to make and use the disclosure, describes several embodiments, adaptations, variations, alternatives, and use of the disclosure, including what is presently believed to be the best mode of carrying out the disclosure.

The present invention provides an apparatus for forming a stackable, reinforced container formed from a single sheet of material. The container is sometimes referred to as a reinforced mitered tray or a reinforced eight-sided tray. In one embodiment, the container is fabricated from a paperboard material. The container, however, may be fabricated using any suitable material, and therefore is not limited to a specific type of material. In alternative embodiments, the container is fabricated using cardboard, fiberboard, paperboard, foamboard, corrugated paper, and/or any suitable material known to those skilled in the art and guided by the teachings herein provided. The container includes lines of perforation for removal of a portion of the container for displaying articles for sale, and a blank used for forming the container is described below in detail.

In an example embodiment, the container includes at least one marking thereon including, without limitation, indicia that communicates the product, a manufacturer of the product and/or a seller of the product. For example, the marking may include printed text that indicates a product's name and briefly describes the product, logos and/or trademarks that indicate a manufacturer and/or seller of the product, and/or designs and/or ornamentation that attract attention. "Printing," "printed," and/or any other form of "print" as used herein may include, but is not limited to including, ink jet printing, laser printing, screen printing, giclée, pen and ink, painting, offset lithography, flexography, relief print, rotogravure, dye transfer, and/or any suitable printing technique known to those skilled in the art and guided by the teachings herein provided. In another embodiment, the container is void of markings, such as, without limitation, indicia that communicates the product, a manufacturer of the product and/or a seller of the product.

It should be understood that features included in one embodiment can be used with other embodiments described herein. Further, any of the containers described herein can include handles defined through end and/or side walls thereof. Moreover, vent holes, can be defined through any suitable panel in any of the embodiments and have any suitable size, shape, orientation, and/or location that enable the below-described blanks and containers to function as described herein. Still further, the containers described herein can include adhesives such as, but not limited to, glue, tape and sealing strips which can have any suitable size, shape, orientation, and/or location that enable the below-described blanks and containers to function as described herein.

Different embodiments described here can vary in size and/or dimensions although similar labels are used for each embodiment. For example, although a depth is labeled similarly throughout the description, each embodiment can have varying depths.

Figure 2:
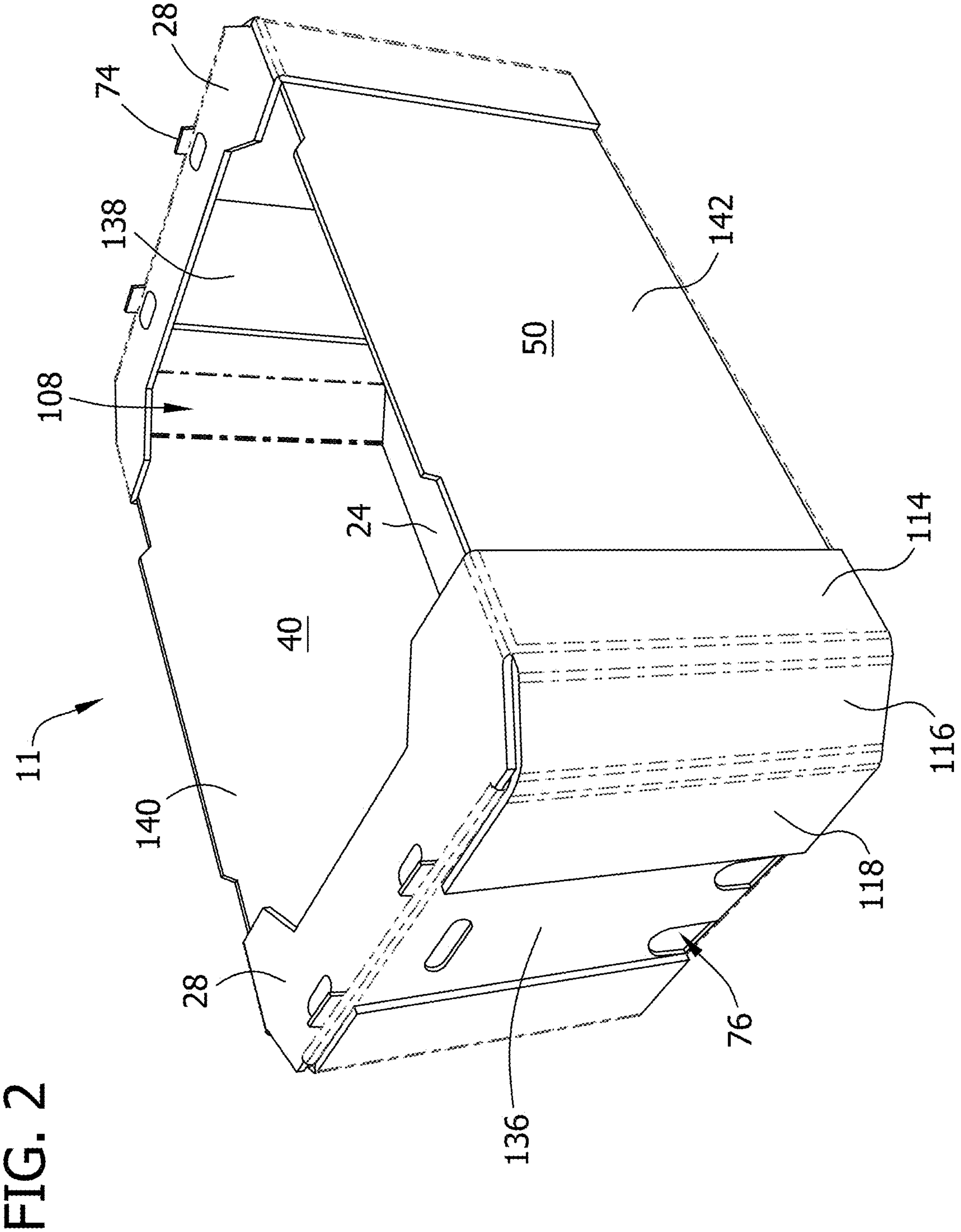
FIG. 2 is a perspective schematic view of a container formed from the blank shown in FIG. 1.

Referring now to the drawings, and more specifically to FIGS. 1 and 2, although as described above a container may have any suitable size, shape, and/or configuration, FIGS. 1 and 2 illustrate the construction or formation of one exemplary embodiment of a container. Specifically, FIG. 1 is a top plan view of an exemplary blank 10 of sheet material. FIG. 2 is a top perspective view of a container 11 formed from blank 10.

Referring to FIGS. 1 and 2, blank 10 has a first or interior surface 12 and an opposing second or exterior surface 14. Further, blank 10 defines a first edge 16 and an opposing second edge 18. In one embodiment, blank 10 includes, in series from edge 16 to edge 18, a first top panel 20, a first side panel 22, a bottom panel 24, a second side panel 26, and a second top panel 28 coupled together along preformed, generally parallel, fold lines 30, 32, 34, and 36, respectively. Blank 10 includes, in series from first edge 16 to second edge 18, a first reinforcing assembly 38, a front end panel 40 and a second reinforcing assembly 42 coupled together along preformed, generally parallel fold lines 44 and 46 respectively. Moreover, blank 10 includes, in series from edge 16 to edge 18, a third reinforcing assembly 48, a rear end panel 50 and a fourth reinforcing assembly 52 coupled together along preformed, generally parallel fold lines 54 and 56 respectively.

More specifically, first top panel 20 extends from first edge 16 to fold line 30, first side panel 22 extends from first top panel 20 along fold line 30, bottom panel 24 extends from first side panel 22 along fold line 32, second side panel 26 extends from bottom panel 24 along fold line 34, and second top panel 28 extends from second side panel 26 along fold line 36 to second edge 18. Fold lines 30, 32, 34 and/or 36, as well as other fold lines and/or hinge lines described herein, may include any suitable line of weakening and/or line of separation known to those skilled in the art and guided by the teachings herein provided. When container 11 is formed from blank 10, fold line 32 defines a bottom edge of first side panel 22 and a first side edge of bottom panel 24, and fold line 34 defines a second side edge of bottom panel 24 and a bottom edge of second side panel 26. Further, when container 11 is formed from blank 10, fold line 30 defines a side edge of first top panel 20 and a top edge of first side panel 22, and fold line 36 defines a top edge of second side panel 26 and a side edge of second top panel 28.

Front end panel 40 extends from bottom panel 24 along fold line 71 and rear end panel 50 extends from bottom panel 24 along fold line 73. In the exemplary embodiment, stacking tabs 74 are coupled to first side panel 22 and second side panel 26. Further, in the exemplary embodiment, vent openings 76 are defined along fold lines 32 and 34; however, it should be understood that blank 10 includes any suitable number of vent openings 76 and stacking tabs 74. Further, vent openings 76 and stacking tabs 74 can have any suitable size and/or shape that enables blank 10 and/or container 11 to function as described herein.

In the exemplary embodiment, bottom panel 24 may be considered to be substantially rectangular in shape with four cut-off corners or angled edges 78 formed by cut lines. As such, the cut-off corner edges 78 of otherwise rectangular bottom panel 24 define an octagonal shape of bottom panel 24. Alternatively, bottom panel 24 has any suitable shape that enables container 11 to function as described herein.

First top panel 20 and second top panel 28 are substantially congruent and have a generally trapezoidal shape. More specifically, first top panel 20 includes an angled edge 80 extending from first edge 16 toward an apex 82 and an angled edge 84 extending from edge 16 toward an apex 86. A free edge 88 extends between angled edge 80 and angled edge 84. Angled edge 80, free edge 88 and angled edge 84 define a cutout 90. Second top panel 28 includes an angled edge 92 extending from second edge 18 toward an apex 94 and an angled edge 96 extending from edge 18 toward an apex 98. A free edge 100 extends between angled edge 92 and angled edge 96. Angled edge 92, free edge 100 and angled edge 96 define a cutout 102.

First reinforcing assembly 38 and second reinforcing assembly 42 extend from side edges of front end panel 40 and from first top panel 20 and second top panel 28, respectively. Third reinforcing assembly 48 and fourth reinforcing assembly 52 extend from side edges of rear end panel 50 and from first top panel 20 and second top panel 28, respectively. Each side edge is defined by respective fold lines 44, 46, 54 or 56. Fold lines 44, 46, 54 and 56 are substantially parallel to each other. Alternatively, fold lines 44, 46, 54 and/or 56 are other than substantially parallel. Further, each reinforcing panel assembly 38, 42, 48 and 52 are substantially similar and include an inner reinforcing panel assembly 104 and an outer reinforcing panel assembly 106. Moreover, inner reinforcing panel assembly 104 includes a corner panel 110 and a minor panel 112; and outer reinforcing panel assembly 106 includes a first overlap panel 114, a miter panel 116 and a second overlap panel 118. Each reinforcing panel assembly 38, 42, 48 and 52 is configured to form a reinforcing corner assembly 108 (shown in FIG. 2) when container 11 is formed from blank 10.

Inner reinforcing panel assembly 104 extends from front end panel 40 or rear end panel 50 along each of fold lines 44, 46, 54 and 56. Further, outer reinforcing panel assembly 106 extends from first top panel 20 or second top panel 28. In the exemplary embodiment, each inner reinforcing panel assembly 104 includes a fold line 120 that divides each inner reinforcing panel assembly 104 into corner panel 110 and minor panel 112. Fold line 120 defines an edge of corner panel 110 and a side edge minor panel 112. In the exemplary embodiment, corner panel 110 and minor panel 112 are substantially rectangular. Alternatively, corner panel 110 and minor panel 112 are shaped other than substantially rectangular.

Further, each outer reinforcing panel assembly 106 includes fold lines 122 and 124 that divide each outer reinforcing panel assembly 106 into first overlap panel 114, miter panel 116 and second overlap panel 118. More specifically, miter panel 116 extends from first overlap panel 114 along fold line 122, and second overlap panel 118 extends from miter panel 116 along fold line 124. Fold line

122 defines an edge of miter panel 116 and a side edge of first overlap panel 114, fold line 124 defines a side edge of miter panel 116 and an edge of second overlap panel 118. In the exemplary embodiment, corner panel 110 and miter panel 116 are substantially congruent.

Referring to FIG. 2, to construct container 11 from blank 10, first side panel 22 is rotated about fold line 32 toward interior surface 12 of front end panel 40, front end panel 40 is rotated about fold line 71 toward interior surface 12 of second side panel 26, second side panel 26 is rotated about fold line 34 toward interior surface 12 of rear end panel 50 and rear end panel 50 is rotated about fold line 73 toward interior surface 12 of first side panel 22. In the exemplary embodiment, after rotating panels 22, 26, 40 and 50 about fold lines 32, 34, 71 and 73, side panels 22 and 26 are substantially parallel to each other and substantially perpendicular to end panels 40 and 50.

Once panels 22, 26, 40 and 50 are rotated about fold lines 32, 34, 71 and 73, first side panel 22 forms a first side wall 136, second side panel 26 forms a second side wall 138, front end panel 40 forms a front wall 140 and rear end panel 50 forms a rear wall 142. To continue construction, first reinforcing assembly 38 is rotated and coupled to first side panel 22 and front end panel 40 and second reinforcing assembly 42 is rotated and coupled to second side panel 26 and front end panel 40. Third reinforcing assembly 48 is rotated and coupled to first side panel 22 and rear end panel 50 and fourth reinforcing assembly 52 is rotated and coupled to second side panel 26 and rear end panel 50.

More specifically, inner assembly 104 of first reinforcing assembly 38 is rotated and coupled to interior surface of first side panel 22, first top panel 20 is rotated about fold line 30 toward interior surface 12 of bottom panel 24, and outer assembly 106 of first reinforcing assembly 38 is rotated and coupled to exterior surfaces 14 of first side panel 22 and front end panel 40.

Inner assembly 104 of second reinforcing assembly 42 is rotated and coupled to interior surface of second side panel 26, second top panel 28 is rotated about fold line 36 toward interior surface 12 of bottom panel 24, and outer assembly 106 of second reinforcing assembly 42 is rotated and coupled to exterior surfaces 14 of second side panel 26 and front end panel 40. Inner assembly 104 of third reinforcing assembly 48 is rotated and coupled to interior surface of first side panel 22, first top panel 20 is rotated about fold line 30 toward interior surface 12 of bottom panel 24, and outer assembly 106 of third reinforcing assembly 48 is rotated and coupled to exterior surfaces 14 of first side panel 22 and rear end panel 50. Inner assembly 104 of fourth reinforcing assembly 52 is rotated and coupled to interior surface of second side panel 26, second top panel 28 is rotated about fold line 36 toward interior surface 12 of bottom panel 24, and outer assembly 106 of fourth reinforcing assembly 52 is rotated and coupled to exterior surfaces 14 of second side panel 26 and rear end panel 50.

In the exemplary embodiment, minor panels 112 are adhered to an interior surface 12 of first and second side panels 22 and 26 so that corner panels 110 extend diagonally across the corners of the interior of container 11, acting as stacking support structures. In particular, corner panels 110 are folded over to positions parallel to bottom panel 24. Then, first overlap panels 114 are folded down to positions perpendicular to exterior surfaces 14 of panels 40 and 50. Second overlap panels 118 are then folded perpendicular to first overlap panels 114 and adhered to exterior surfaces 14 of side panels 22 and 26. Miter panels 116 of each assembly 38, 42, 48 and 52 are coupled to angled edges 78 of bottom panel 24 and corner panels 110 to form reinforcing corner assemblies 108.

Figure 3:
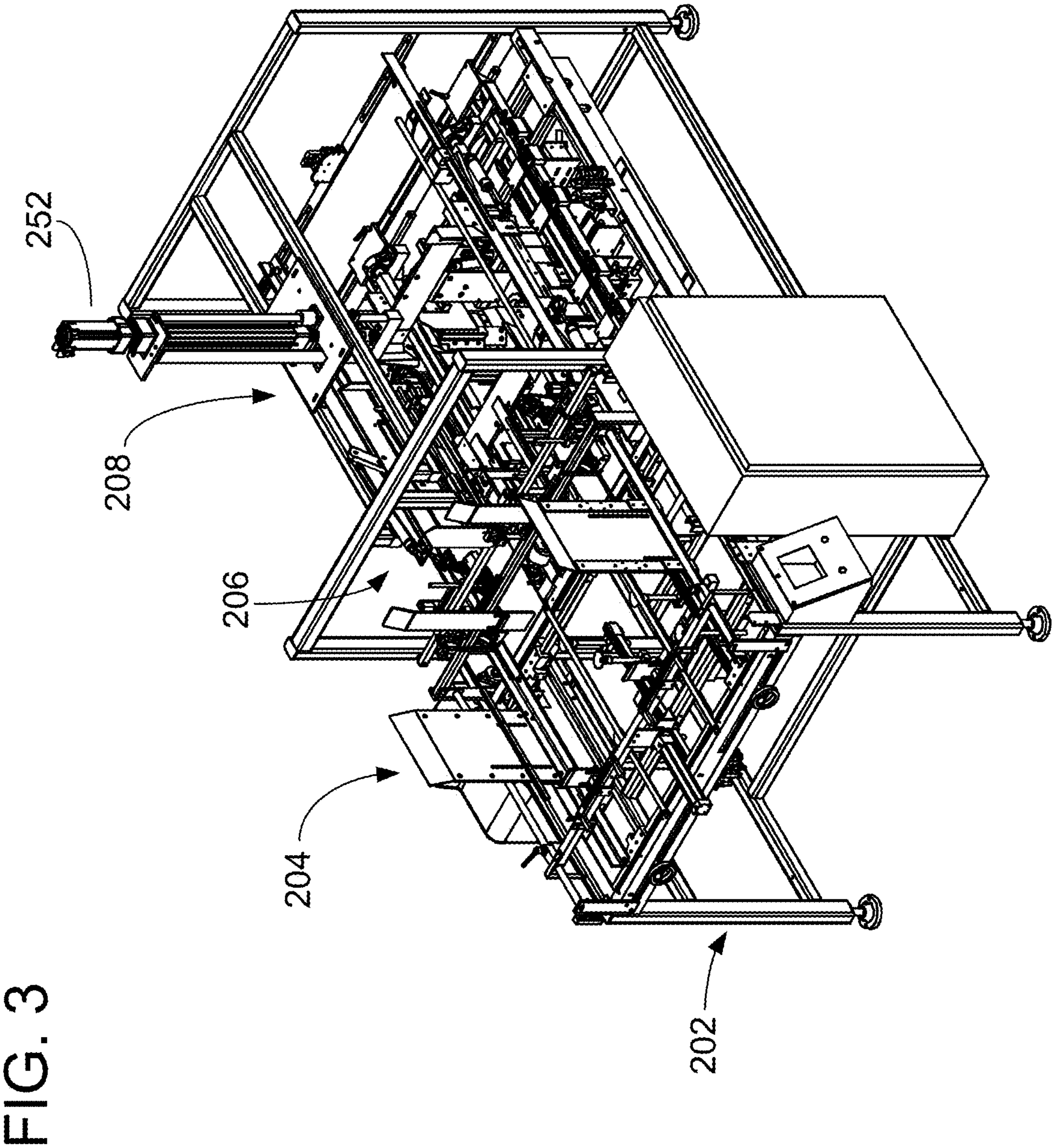
FIG. 3 is a perspective view of an exemplary container forming apparatus used to form the container shown in FIG. 2.

FIG. 3 illustrates an exemplary container forming apparatus 200 for forming blank 10 into fully formed container 11. Container forming apparatus 200 generally includes a frame 202, a blank feeder assembly 204, an adhesive assembly 206, and a compression assembly 208.

Figure 4:
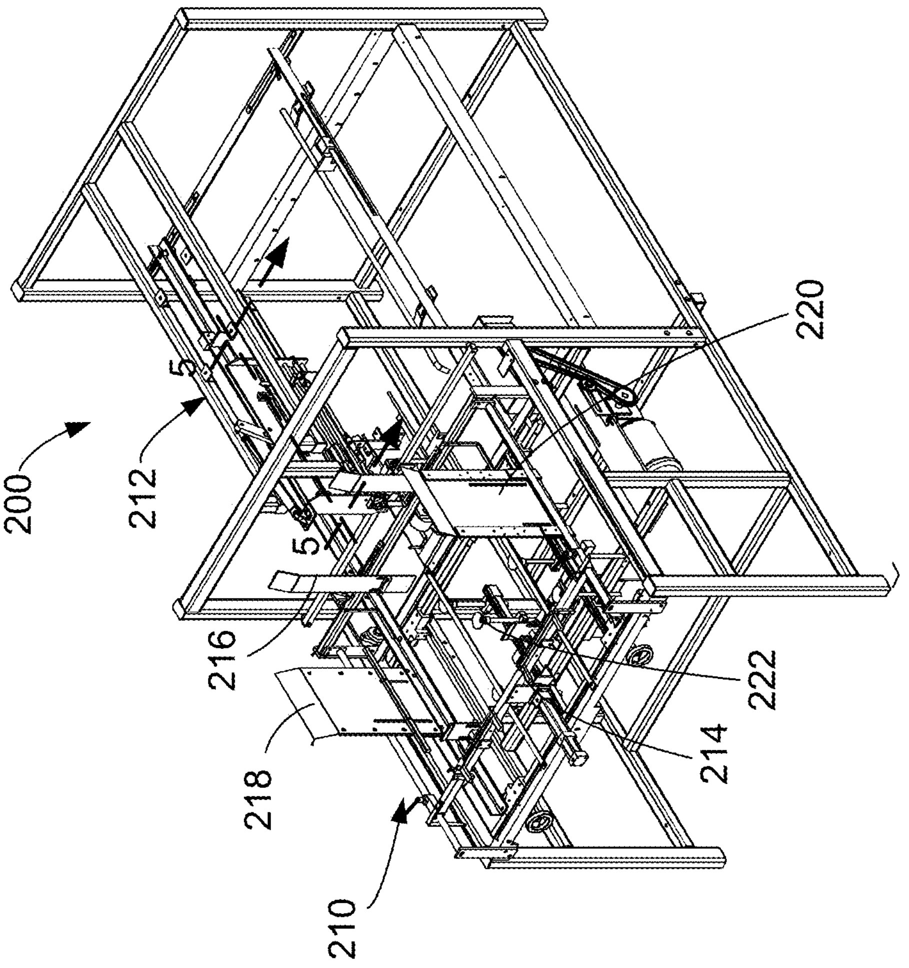
FIG. 4 is a perspective view of an exemplary blank feeder assembly of the apparatus shown in FIG. 3.

FIG. 4 illustrates blank feeder assembly 204 that includes a hopper assembly 210 for holding a stack of blanks and a pusher assembly 212 to move blank 10 to compression assembly 208. Hopper assembly 210 includes opposed hopper end-walls 214 and 216 and opposed hopper sidewalls 218 and 220. Vacuum suction cups 222 are positioned beneath hopper assembly 210 and rollers (not shown) transport a single blank 10 from hopper assembly 210 to compression assembly 208. Pusher assembly 212 precisely positions blank 10 within compression assembly 208.

Figure 5:
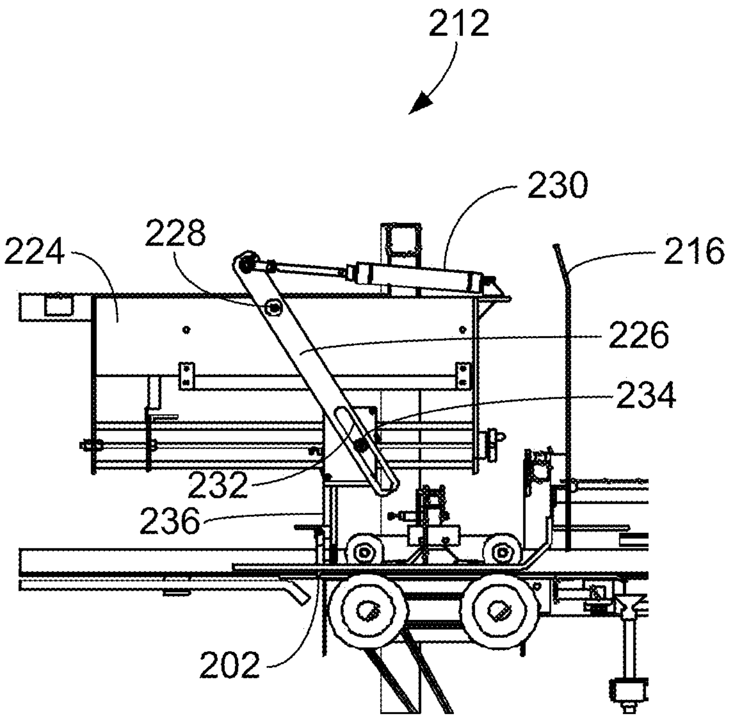
FIG. 5 is a cross-sectional view of an exemplary pusher assembly of the apparatus shown in FIG. 3 and taken along line 5-5.

FIG. 5 illustrates a cross-sectional view of pusher assembly 212 that includes a mount slide 224 coupled to frame 202. A slide bar 226 is rotatably coupled to mount slide 224 at pivot 228, and slide bar 226 is rotated by an actuator 230. Slide bar 226 includes an aperture 232 to receive a cam follower 234 that is coupled to a slide plate 236. Slide bar 226 rotates to move slide plate 236 into contact with blank 10 to push it along guide rails 238 and 240 (shown in FIG. 8) and position blank 10 within compression assembly 208.

Figure 6:
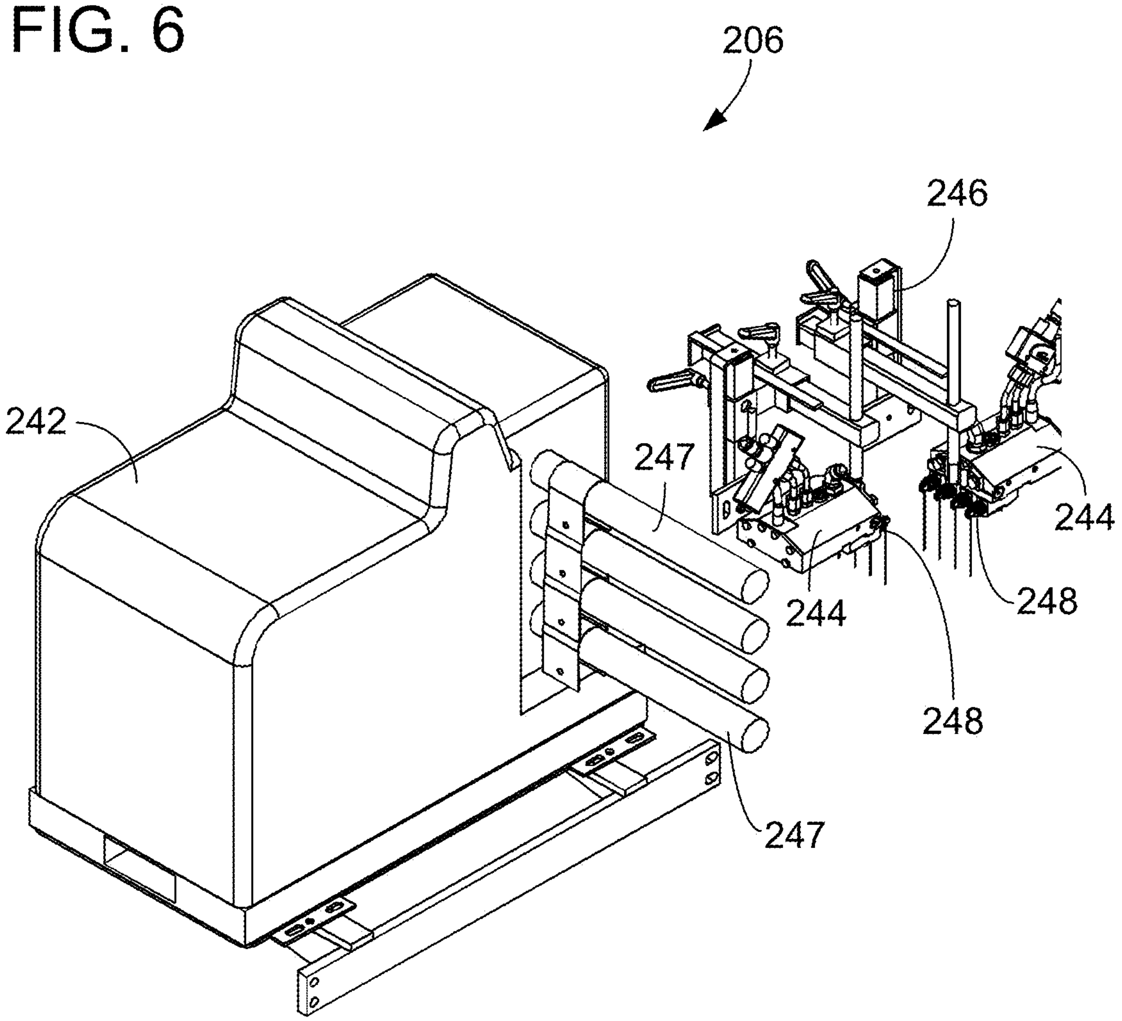
FIG. 6 is a perspective view of an exemplary adhesive assembly of the apparatus shown in FIG. 3.

FIG. 6 illustrates adhesive assembly 206 that includes an adhesive unit 242 and adhesive guns 244. Hoses 247 are coupled between adhesive unit 242 and adhesive guns 244 to deliver adhesive thereto. In the exemplary embodiment, two adhesive guns 244 are shown. However, any number of adhesive guns 244 may be provided that enables apparatus 200 to function as described herein. Adhesive guns 244 are coupled to gun mount 246 coupled to frame 202 and include a plurality of nozzles 248 to apply adhesive to predetermined portions of blank 10 as it is transferred to compression assembly 208.

Figure 7:
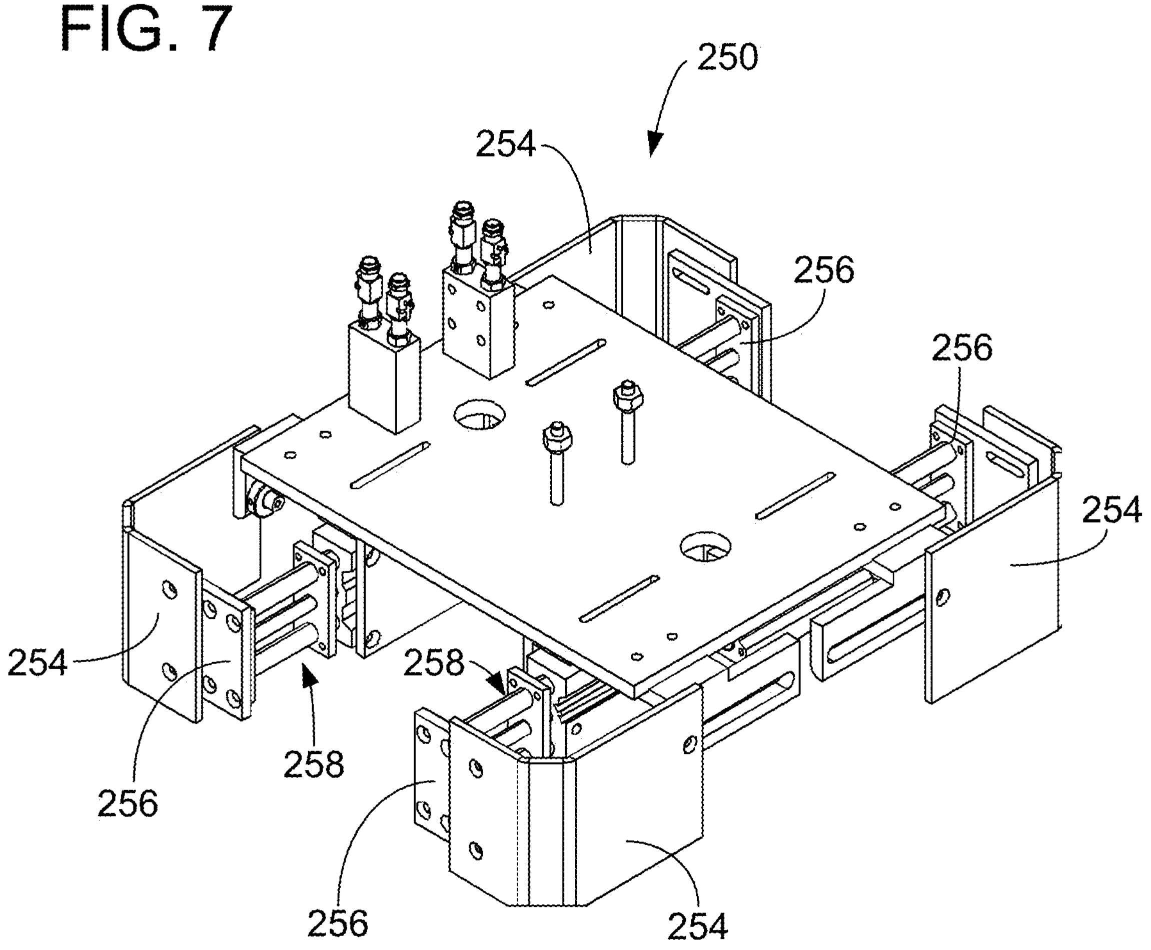
FIG. 7 is a perspective view of an exemplary mandrel assembly of the apparatus shown in FIG. 3.

FIG. 7 illustrates a mandrel assembly 250 of compression assembly 208. A mandrel drive 252 (shown in FIG. 3) is coupled to mandrel assembly 250 to move it from a first position proximate and in spaced relation to blank 10 and a second position through an initial movement and biasing mandrel assembly 250 against blank 10 for driving the blank downstream of the first position. Mandrel assembly 250 includes retractable forming plates 254 slidably coupled to plate guides 256 by actuator mounts 258. In the example embodiment, mandrel drive 252 is driven by a servo-controlled machine.

Figure 8:
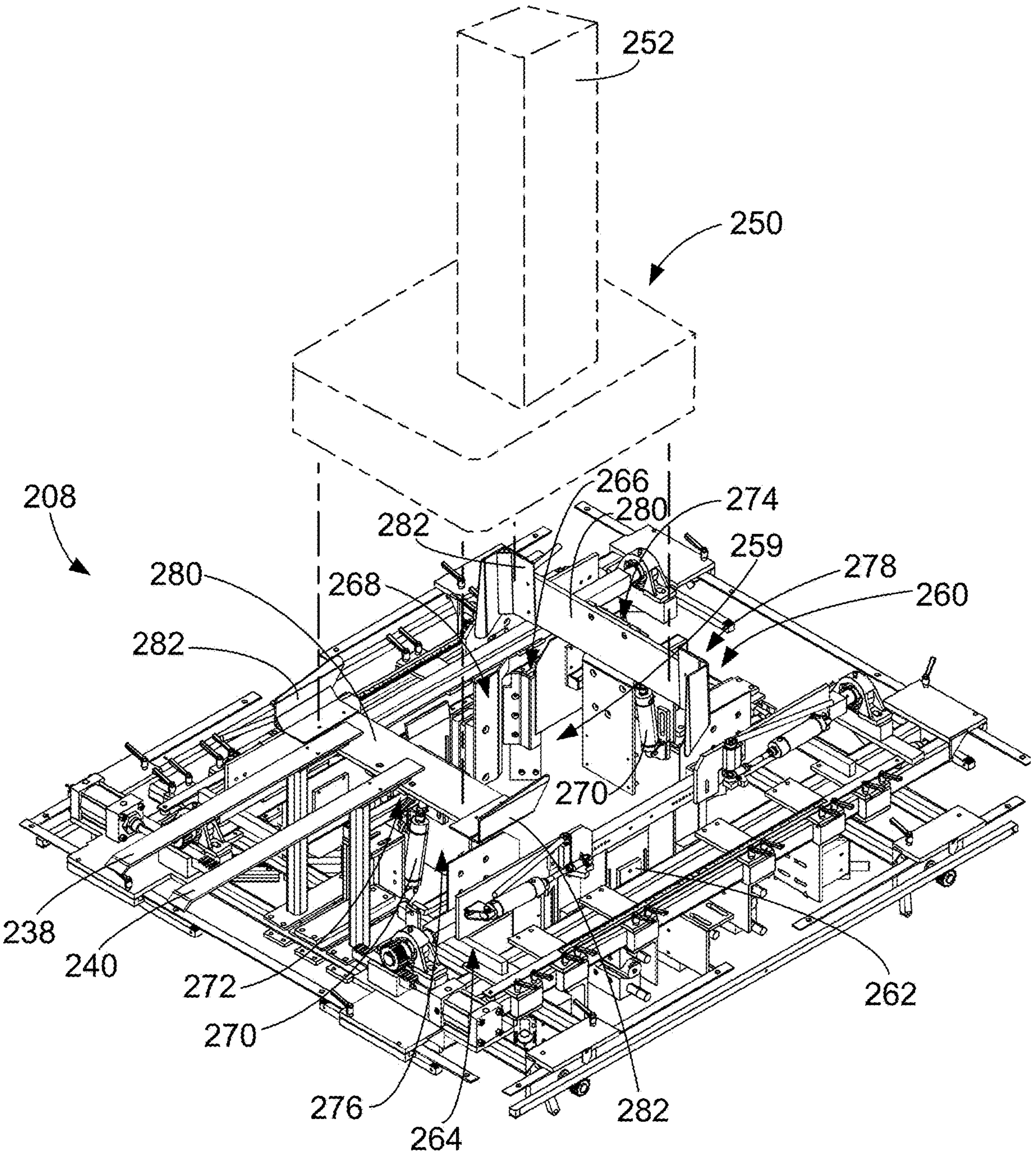
FIG. 8 is a perspective view of an exemplary compression assembly of the apparatus shown in FIG. 3.
Figure 12:
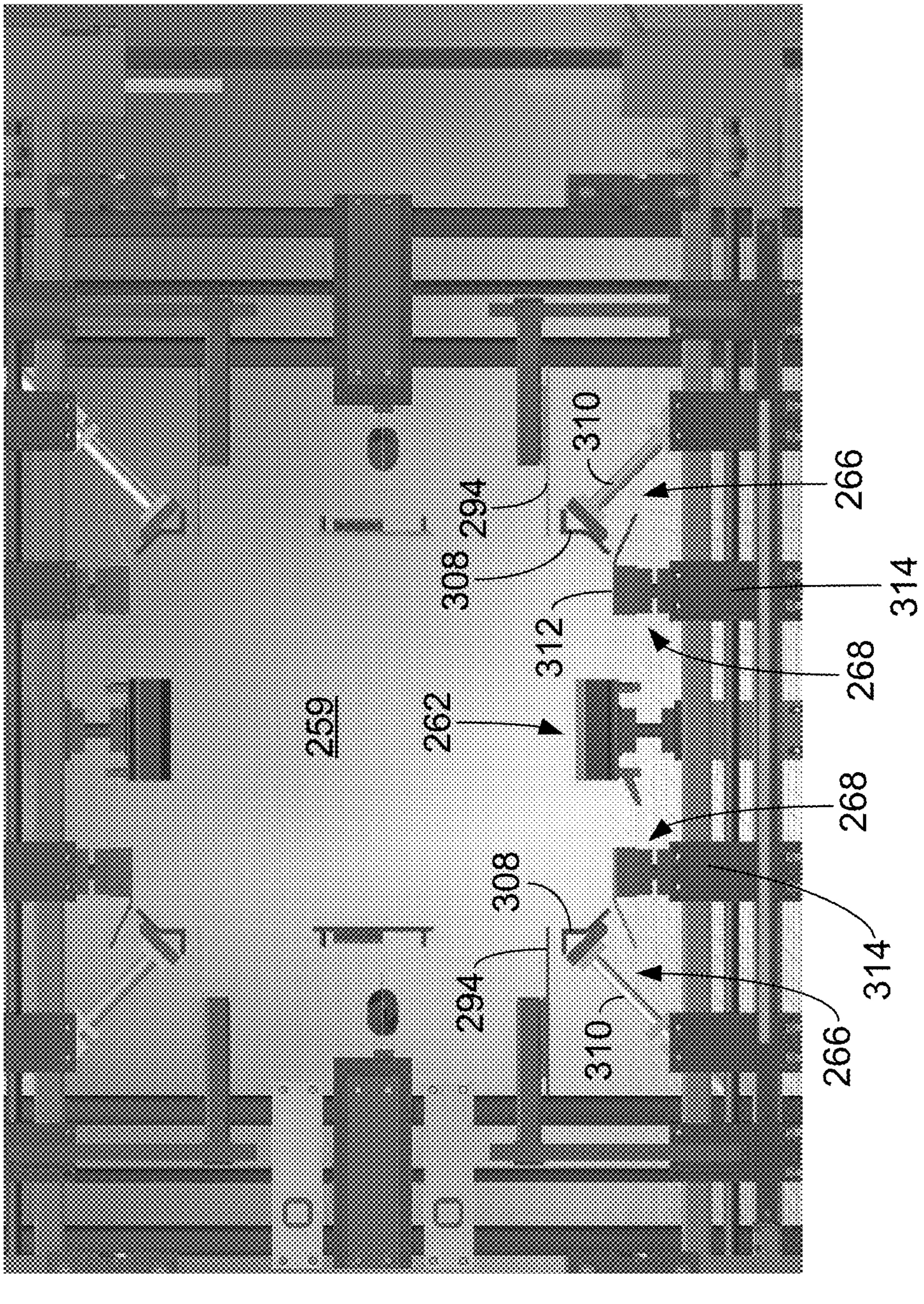
FIG. 12 is a top plan schematic view of the compression assembly shown in FIG. 8.

FIGS. 8 and 12 illustrate compression assembly 208 that includes a central passage 259, an upper folding arm assembly 260, a compression plate 262, a rollover arm assembly 264, a miter pusher plate 266, and an end-wall plate 268. Upper folding arm assembly 260 includes actuators 270 coupled to a first folding arm 272 and a second folding arm 274 to move folding arms 272 and 274 between a first position 276 and a second position 278. Folding arms 272 and 274 each include a main compression plate 280 and a folding ear 282 coupled to each end of main compression plate 280. Compression plate 262 is movable between from first position (shown) into central passage 259 to a second position (not shown) and includes a ledge 284 to prevent further movement of blank 10 into central passage 259 when blank 10 is engaged by mandrel assembly 250.

Figure 9:
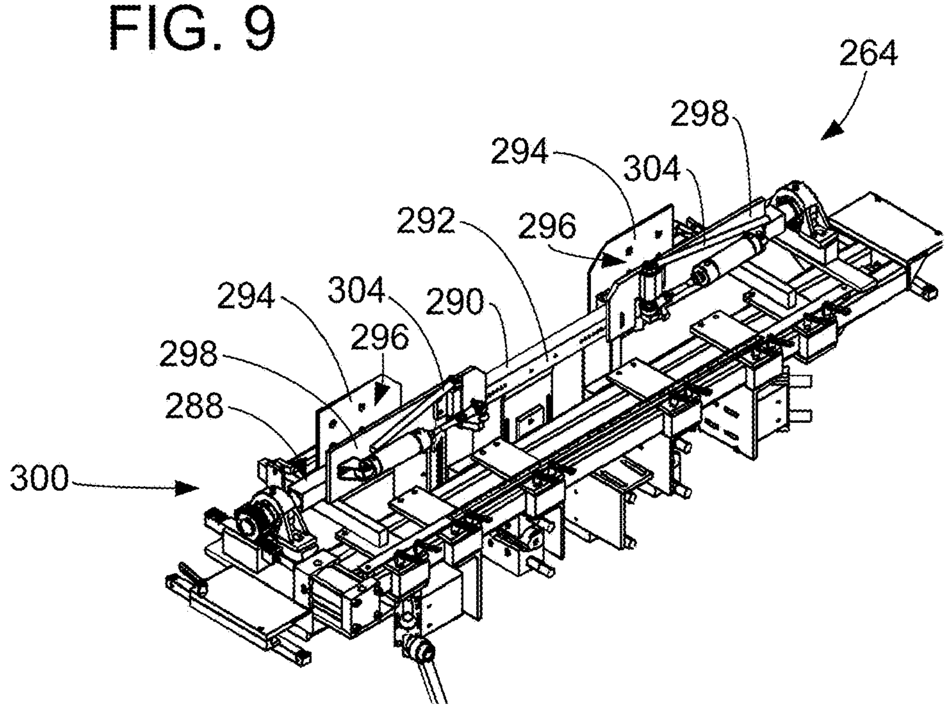
FIG. 9 is a perspective view of an exemplary rollover arm assembly of the apparatus shown in FIG. 3 and in a first position.
Figure 10:
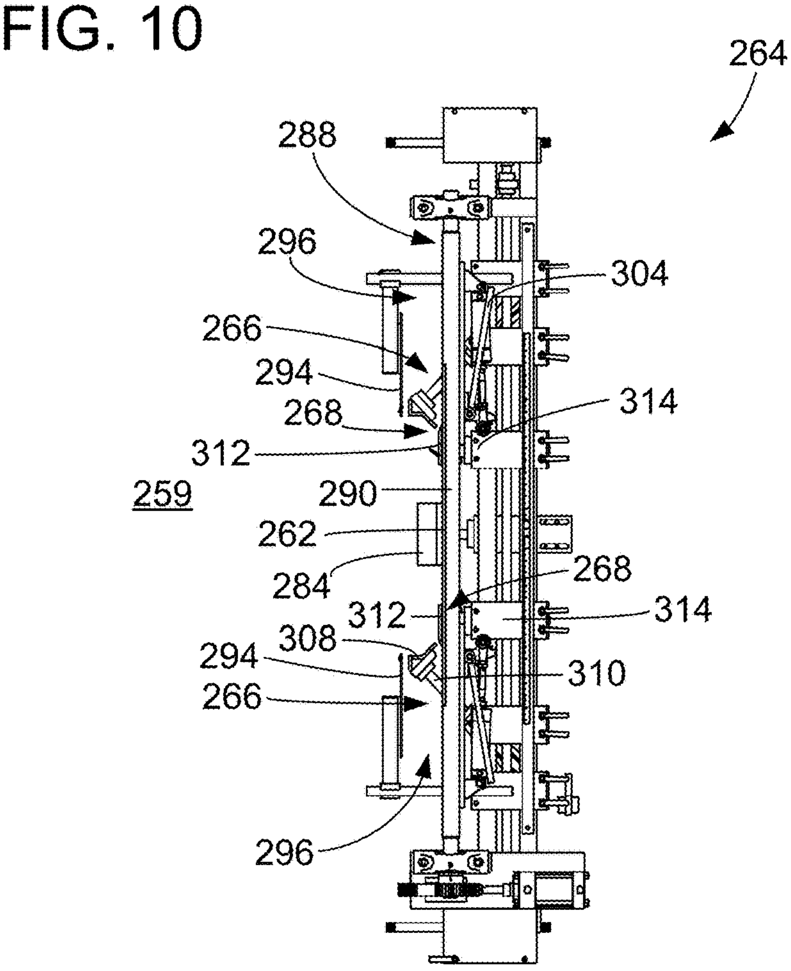
FIG. 10 is a top plan view of the rollover arms assembly shown in FIG. 9.
Figure 11:
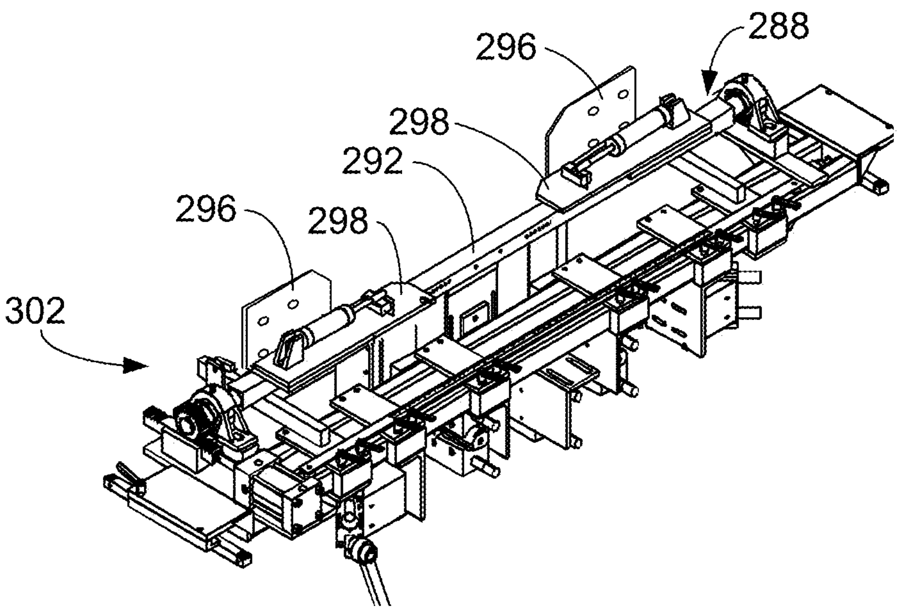
FIG. 11 is a perspective view of the rollover arm assembly shown in FIG. 9 and in a second position.

FIGS. 9-11 illustrate rollover arm assembly 264 that includes opposed rotating bars 288 each having a first surface 290 and a second surface 292. Rotating bars 288 are carried in spaced relation to fixed plates 294 to form passages 296. Folding plates 298 are coupled to rotating bar second surface 292 and are oriented substantially parallel to fixed plates 294 in a first position 300 (shown in FIG. 9). Rotating bars 288 rotate to a second position 302 (shown in FIG. 11) where folding plates 298 are oriented substantially orthogonal to fixed plates 294. A folding arm 304 is coupled to each folding plate 298 and is actuated by an actuator 306 from a first position through passage 296 between fixed plate 294 and folding plate 298 to a second position (not shown).

In the exemplary embodiment, miter pusher plates 266 are coupled to frame 202 and each include a corner compression plate 308 and an actuator 310. Actuator 310 is operable to move corner compression plate 308 from a retracted first position (not shown) toward central passage 259 and at least partially into passage 296 to an extended second position (as best shown in FIG. 10). End wall plates 268 are coupled to frame 202 and each include a side compression plate 312 and an actuator 314. Actuator 314 is operable to move side compression plate 312 from a retraced first position (as best shown in FIG. 9) toward central passage 259 to an extended second position (not shown).

In an exemplary operation of container forming apparatus 200, blanks 10 are loaded into blank feeder assembly 204. Initially, a plurality of blanks 10 are loaded into hopper assembly 210 between hopper end-walls 214, 216 and hopper sidewalls 218, 220. Vacuum suction cups 222 engage and remove a single blank 10 from the plurality of blanks 10. Powered rollers (not shown) direct blank 10 (e.g., front end panel 40 first) to compression assembly 208 while adhesive guns 244 of adhesive assembly 206 apply an adhesive to desired portions of blank 10 (e.g. a portion of first side panel 22, second side panel 26, first overlap panel 114, miter panel 116, and second overlap panel 118). Actuator 230 of pusher assembly 212 actuates slide plate 236 to precisely position blank 10 within compression assembly 208.

Once blank 10 is positioned within compression assembly 208 generally across central passage 259, mandrel drive 252 is actuated to move mandrel assembly 250 downward and into contact generally with bottom panel 24. During this operation, actuator mounts 258 and forming plates 254 are in their fully extended positions. Mandrel assembly 250 drives bottom panel 24 downward until bottom panel 24 engages ledges 284, which prevents further movement of blank 10 into central passage 259. During movement of mandrel assembly 250, actuators 270 move folding arms 272 and 274 from first position 276 toward mandrel 250 and into second position 278. Folding arm main compression plates 280 each engage one of front end panel 40 and rear end panel 50 to move panels 40 and 50 toward forming plates 254 of mandrel assembly 250. Folding ears 282 pre-fold corner panels 110 and minor panels 112 along fold lines 54 and 120 and push corner panels 110 and minor panels 112 against forming plates 254.

As mandrel assembly 250 pushes blank 10 downward through central passage 259, first top panel 20, first side panel 22, second side panel 26, and second top panel 28 contact rotating bars 288 and are folded along fold lines 32 and 34 toward forming plates 254. Compression plates 262 then extend toward and contact first side panel 22 and second side panel 26 to push panels 22 and 26 against minor panels 112 and forming plates 254. Subsequently, rollover arm assembly 264 is actuated to rotate rotating bar 288 toward mandrel 250 so rotating bar first surface 290 is generally facing mandrel 250. During rotation of bar 288, folding plates 298 rotate from the first position (shown in FIG. 9) toward and into contact with first top panel 20 and second top panel 28 to the second position (shown in FIG. 11).

With panels 20 and 28 generally oriented perpendicularly to first side panel 22 and second side panel 26, respectively, actuator 306 rotates folding arms 304 from the first position toward and into contact with first overlap panels 114 to the second position. Folding arms 304 push first overlap panels 114 through passage 296 between fixed plate 294 and rotating bar 288. Miter panels 116 and second overlap panels 118 contact corner compression plate 308 and are pre-folded along fold lines 122 and 124. Fixed plate 294 orients first overlap panels 114 generally square to bottom panel 24 as folding arms 304 push first overlap panels 114 against front end panel 40 and rear end panel 50. Actuators 310 actuate miter pusher plates 266 to push corner compression plates 308 from the first position toward forming plates 254 to the second position. Corner compression plates 308 contact miter panels 116 and push panels 116 against corner panels 110. Actuators 314 actuate end-wall plates 268 to push side compression plates 312 from the first position toward forming plates 254 to the second position. Side compression plates 312 contact second overlap panels 118 and push panels 118 against first side panel 22 and second side panel 26 to form container 11. Actuator mounts 258 retract forming plates 254, mandrel drive 252 retracts mandrel 250 from central passage 259, and container 11 is expelled from compression assembly 208 as a finished product.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of forming a container, said method comprising:

positioning a blank in a blank feeder assembly;

feeding the blank to a compression assembly; and forming the container from the blank within the compression assembly, wherein the compression assembly includes a mandrel assembly, an upper folding arm assembly including a plurality of folding arms moveable between a first position and a second position, a compression plate, and a rollover arm assembly, wherein forming the container comprises:

driving the mandrel assembly downwardly against a bottom panel of the blank;

rotating a first folding arm of the plurality of folding arms from the first position to the second position, said rotating comprising folding a first portion of the blank towards the mandrel assembly and into a perpendicular orientation relative to the bottom panel;

folding, with the compression plate, a second portion of the blank into contact with the first portion of the blank and into a perpendicular orientation relative to the bottom panel; and folding, with the rollover arm assembly, a third portion of the blank coupled to the second portion of the blank, said folding comprising rotating the third portion of the blank from a perpendicular orientation relative to the bottom panel into a parallel orientation relative the bottom panel.

2. A method in accordance with claim 1, further comprising applying an adhesive to the blank with an adhesive assembly.

3. A method in accordance with claim 1, wherein feeding the blank to a compression assembly comprises moving the blank from the blank feeder assembly to the compression assembly with a pusher assembly.

4. A method in accordance with claim 3, wherein moving the blank comprises actuating a slide plate of the pusher assembly to position the blank within the compression assembly.

5. A method in accordance with claim 1, wherein forming the container further comprises:

folding a fourth portion of the blank with a miter pusher plate; and folding a fifth portion of the blank with an end-wall plate.

6. A method in accordance with claim 1 wherein driving the mandrel assembly into the bottom panel of the blank comprises driving the bottom panel of the blank downward until the bottom panel engages a ledge of the compression plate.

7. A method in accordance with claim 1, wherein folding the first portion of the blank comprises folding a front end panel and a back end panel of the blank with folding arm main compression plates.

8. A method in accordance with claim 1, wherein folding the first portion of the blank comprises folding corner panels of the blank with folding ears.

9. A method in accordance with claim 1, further comprising expelling the formed container from the compression assembly.

* * * * *